United States Patent [19]
Vanderlaan et al.

[11] Patent Number: 5,962,548
[45] Date of Patent: Oct. 5, 1999

[54] SILICONE HYDROGEL POLYMERS

[75] Inventors: Douglas G. Vanderlaan; Marcie Hargiss, both of Jacksonville, Fla.

[73] Assignee: Johnson & Johnson Vision Products, Inc., Jacksonville, Fla.

[21] Appl. No.: 09/033,348

[22] Filed: Mar. 2, 1998

[51] Int. Cl.$^6$ ..................................................... C08F 30/08
[52] U.S. Cl. .......................................... 523/107; 526/279
[58] Field of Search ............................... 523/107; 526/279

[56] References Cited

U.S. PATENT DOCUMENTS

| | | |
|---|---|---|
| 3,808,178 | 4/1974 | Gaylord . |
| 4,136,250 | 1/1979 | Mueller et al. . |
| 4,153,641 | 5/1979 | Deichert et al. . |
| 4,259,467 | 3/1981 | Keogh et al. . |
| 4,293,397 | 10/1981 | Sato et al. . |
| 4,495,313 | 1/1985 | Larsen . |
| 4,605,712 | 8/1986 | Mueller et al. . |
| 4,661,573 | 4/1987 | Ratkowski et al. . |
| 4,703,097 | 10/1987 | Wingler et al. . |
| 4,889,664 | 12/1989 | Kindt-Larsen et al. . |
| 4,954,587 | 9/1990 | Mueller . |
| 5,010,141 | 4/1991 | Mueller . |
| 5,039,459 | 8/1991 | Kindt-Larsen et al. . |
| 5,070,169 | 12/1991 | Robertson et al. . |
| 5,070,170 | 12/1991 | Robertson et al. . |
| 5,079,319 | 1/1992 | Mueller . |
| 5,115,056 | 5/1992 | Mueller et al. . |
| 5,310,779 | 5/1994 | Lai . |
| 5,321,108 | 6/1994 | Kunzler et al. . |
| 5,336,797 | 8/1994 | McGee et al. . |
| 5,358,995 | 10/1994 | Lai et al. . |
| 5,387,632 | 2/1995 | Lai et al. . |
| 5,387,662 | 2/1995 | Kunzler et al. . |
| 5,451,617 | 9/1995 | Lai et al. . |
| 5,486,579 | 1/1996 | Lai et al. . |
| 5,539,016 | 7/1996 | Kunzler et al. . |
| 5,556,929 | 9/1996 | Yokoyama ................................ 523/107 |

FOREIGN PATENT DOCUMENTS

96/31792  10/1996  WIPO .

OTHER PUBLICATIONS

R. Baron et al., "The Influece of Siloxane Hydrogels Phase Segregation on Extended Wear Contact Lens Use," Proc. of the A.C.S. Div. of Polym. At., Sci. & Eng., vol. 76, 1997.

A. Domachke et al., "Morphology Requirements for On–Eye Mobility of Soft Oxygen Permeable Contact Lenses," Proc. of the A.C.S. Div. Of Polym. Mat., Sci. & Eng., vol. 76, 1997.

*Primary Examiner*—Paul R. Michl
*Attorney, Agent, or Firm*—Anne B. Kiernan

[57] ABSTRACT

A silicone hydrogel polymer prepared by curing a reaction mixture comprising a hydroxyalkylamine-functional silicone-containing monomer.

19 Claims, No Drawings

SILICONE HYDROGEL POLYMERS

FIELD OF THE INVENTION

This invention relates to polymers that are formed by curing a reaction mixture that comprises silicone-containing monomers, which are hydrated to form silicone hydrogels. Further, this invention relates to the use of these silicone hydrogels to form contact lenses.

BACKGROUND OF THE INVENTION

A hydrogel is a hydrated cross-linked polymeric system that contains water in an equilibrium state. Hydrogels typically are oxygen permeable and biocompatible, making them a preferred material for producing biomedical devices and in particular contact or intraocular lenses.

Conventional hydrogels are prepared from monomeric mixtures predominantly containing hydrophilic monomers, such as, 2-hydroxyethyl methacrylate or N-vinyl pyrrolidone. U.S. Pat. Nos. 4,495,313, 4,889,664 and 5,039,459 disclose the formation of conventional hydrogels. Oxygen permeability of these conventional hydrogel materials relates to the water content of the materials, and is typically below 20–30 barrers. For contact lenses made of the conventional hydrogel materials, that level of oxygen permeability is suitable for short-term wear of the contact lenses; however, that level of oxygen permeability may be insufficient to maintain a healthy cornea during long-term wear of contact lenses (e.g. 30 days without removal). Therefore, efforts have been made and continue to be made to increase the oxygen permeability of conventional hydrogels.

One known way to increase the oxygen permeability of the hydrogels is to add silicone-containing monomers to the hydrogel formulations, thereby making silicone hydrogels. Silicone-containing polymers generally have higher oxygen permeabilities than conventional hydrogels. Silicone hydrogels have been prepared by curing mixtures containing at least one silicone-containing monomer and at least one hydrophilic monomer. Either the silicone-containing monomer or the hydrophilic monomer may function as a crosslinking agent (a crosslinking agent is a monomer having multiple polymerizable functionalities) or a separate crosslinking agent may be employed. The formation of silicone hydrogels has been disclosed in U.S. Pat. Nos. 4,954,587; 5,010,141; 5,079,319, 5,115,056; 5,260,000; 5,336,797; 5,358,995; 5,387,632; 5,451,617; and 5,486,579; and WO 96/31792. Silicone-containing monomers are frequently insoluble with hydrophilic monomers. In these references, these typically incompatible monomers are solubilized by adding the organic diluents n-hexanol, ethanol, or n-nonanol, typically in relatively large amounts of the total weight of the reaction mixture. A large amount of the diluent makes it difficult to mold the silicone hydrogel contact lenses reproducibly, because a large amount of the diluent, if volatile, leads to a large amount of diluent evaporating during the process. Further, the use of such a large amount of diluent may be a fire hazard, and often leads to polymeric materials with reduced toughness. The use of a large amount of diluent may also make it necessary to mold the polymer in a larger sized mold to compensate for the shrinkage caused by the removal of the diluent after polymerization. More importantly, the diluents used in the prior art inadequately solubilize many blends of silicone monomers and macromers and hydrophilic monomers, especially blends with relatively high levels of hydrophilic monomers. These blends and resulting polymers are opaque and not useful for contact lenses.

Other attempts to combine hydrophilic monomers and silicone monomers have been disclosed in the prior art. Such attempts include the following disclosures.

One approach to forming silicone-hydrogels which avoids the addition of high levels of diluents is disclosed in U.S. Pat. Nos. 5,321,108, 5,387,662 and 5,539,016. These patents describe the use of polysiloxanes with a polar fluorinated graft or side group having a hydrogen atom attached to a terminal difluoro-substituted carbon atom. While this does improve compatibility for certain combinations of silicone and hydrophilic monomers, it requires multiple step synthesis of complex silicone macromers.

Silicone macromers made from isophorone diisocyanate, diethylene glycol, polysiloxanediol and 2-hydroxyethyl methacrylate, and polymers made blending these macromers with hydrophilic monomers are disclosed in ACS PMSE Proceeding, 1997, 76, 34.

Silicone functionalized malonate macromers, and hydrogel copolymer of the same with dimethylacrylamide (DMA) are described in ACS PMSE Proceeding, 1997, 76, 36. The addition of hexanol was required to improve compatibility.

Fumarate-capped silicone macromers, and copolymer of the same with methacryloxypropyl tris(trimethylsiloxy) silane (TRIS) and DMA were described in ACS PMSE Proceeding, 1997, 76, 40. Large amounts of hexanol were added to the monomer blends.

Hydroxyalkyl methacrylate terminated silicones, and polymers of the same with TRIS and DMA were described in ACS PMSE Proceeding, 1997, 76, 34. With only one hydroxyl group at each terminus it is unlikely that such macromers had sufficient compatibility with polar monomers like DMA, and the use of relatively high levels of diluents-would likely be required.

2-Isocyanato ethyl methacrylate (IEM) end-capped gluconoamide terminated silicone macromers, and copolymer of the same with TRIS and DMA were described in ACS PMSE Proceeding, 1997, 76, 42. This synthetic approach requires the use of IEM, which is toxic.

WO 96/31792 describes several silicone macromers, and various silicone hydrogels made from blends of these macromers with hydrophilic monomers such as DMA and HEMA and other monomers such as TRIS. Varying amounts of various diluents were used in the monomer blends described therein.

U.S. Pat. No. 3,808,178 discloses the formation of copolymer of small silicone-containing monomers and various hydrophilic monomers.

Silicone macromers made from polyalkylene glycol-terminated polydimethylsiloxanes reacted with diisocyanates and 2-hydroxyethyl methacrylate (HEMA) were described in U.S. Pat. No. 4,136,250, as well as copolymer made with hydrophilic monomers such as N-vinylpyrrolidone (NVP).

A preparation of a copolymer of bis-methacryloxybutyl polydimethylsiloxane and NVP without the use of a diluent was described in U.S. Pat. No. 4,153,641, but since the molecular weight of the polydimethylsiloxane was very low the resulting polymer was hard.

U.S. Pat. No. 4,259,467 described the preparation of polymers of polysiloxanes with hydrophilic sidechains and terminal polymerizable groups. The macromers described therein typically require mutistep synthetic processes.

U.S. Pat. No. 4,605,712 describes copolymer of polydimethylsiloxanes and DMA.

U.S. Pat. No. 4,661,573 describes copolymer of acryloxyalkyl polydimethylsiuoxanes and DMA formed without the addition of a diluent, but the polydimethylsiloxane monomers used had very low molecular weights, and the resulting lenses were hard.

U.S. Pat. No. 4,703,097 describes copolymer of hydrophilic N-vinylcarboxamides, methyl methacrylate and polysiloxane methacrylates.

U.S. Pat. Nos. 5,010,141 and 5,079,319 describe the formation of silicone hydrogel prepolymers by curing hydrothilic monomers such as DMA or NVP with polysiloxanes, and then by further modification to introduce polymerizable functional groups.

U.S. Pat. Nos. 5,070,159 and 5,070,170 describe the formation of polymers from block copolymer of polyethylene glycol or polypropylene glycol and polysiloxanes.

U.S. Pat. Nos. 5,310,779, 5,358,995, 5,387,632 and 5,486,579 describe the preparation of silicone hydrogel contact lenses from copolymer of polysiloxane monomers and hydrophilic monomers.

U.S. Pat. Nos. 5,321,108, 5,387,662 and 5,539,016 describe the preparation of contact lenses from copolymer of fluorosilicone-containing monomers and hydrophilic monomers such as DMA Despite all the attempts in the prior art, there still remains a need for silicone hydrogels which are cured in an economic and efficient way, which require low levels of diluent in the reaction mixture, and which can be used to make soft contact lenses with high oxygen permeability and suitable water content.

SUMMARY OF THE INVENTION

This invention provides a polymer prepared by curing a reaction mixture comprising a linear or branched hydroxyalkylamine-functional silicone-containing monomer. The hydroxyalkylamine-functional silicone-containing monomer preferably is a block or random monomer having the following)g structure:

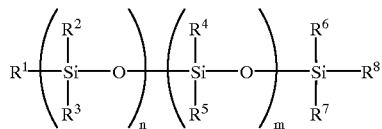

Structure I wherein:
n is 0 to 500 and m is 0 to 500 and (n+m)=10 to 500 and more preferably 20 to 250;
$R^2$, $R^4$, $R^5$, $R^6$ and $R^7$ are independently a monovalent alkyl, or aryl group, which may be further substituted with alcohol, ester, amine, ketone, carboxylic acid or ether groups, preferably unsubstituted monovalent alkyl or aryl groups; and $R^1$, $R^3$ and $R^8$ are independently a monovalent alkyl, or aryl group, which may be further substituted with an alcohol, ester, amine, ketone, carboxylic acid or ether group, preferably unsubstituted monovalent alkyl or aryl groups, or have the following nitrogen-containing structure:

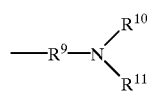

Structure II with the proviso that at least one of $R^1$, $R^3$, and $R^8$ are according to Structure II, wherein $R^9$ is a divalent alkyl group such as $-(CH_2)_s-$ where s is from 1 to 10, preferably 3 to 6 and most preferably 3;
$R^{10}$ and $R^{11}$ are independently H, a monovalent alkyl or aryl group which may be further substituted with an alcohol, ester, amine, ketone, carboxylic acid or ether group, or have the following structure:

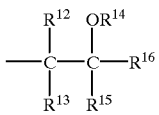

Structure III where $R^{14}$ is H, or a monovalent polymerizable group comprising acryloyl, methacryloyl, styryl, vinyl, allyl or N-vinyl lactam, preferably H or methacryloyl; $R^{16}$ is either H, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam, preferably alkyl substituted with an alcohol or methacrylate; $R^{12}$, $R^{13}$ and $R^{15}$ are independently H, a monovalent alkyl or aryl, which can be further substituted with alcohol, ester, amine, ketone, carboxylic acid or ether groups, or $R^{12}$ and $R^{15}$, or $R^{15}$ and $R^{13}$ can be bonded together to form a ring structure, with the proviso that at least one, preferably at least two, of the Structure II groups on the monomer comprise polymerizable groups. $R^{12}$, $R^{13}$ and $R^{15}$ are preferably H.

The advantages of this invention are that the use of these novel silicone-containing monomers improves the compatibility of the reaction mixtures of silicone-containing monomers with hydrophilic monomers thus allowing reaction mixtures to be made with higher levels of hydrophilic monomers, or with silicone-containing monomers with higher molecular weights, or with reduced diluent levels, (for some reaction mixtures, no diluent), as compared to blends made with silicone-containing monomers disclosed in the prior art. In other embodiments, for example in which relatively large numbers of hydrophilic groups, including hydroxyalkylamine groups alone or in combination with other hydrophilic groups, are incorporated into the hydroxyalkylamine-functional silicone-containing monomers, it may actually be unnecessary to include a hydrophilic monomer in the monomer blends used to form the silicone hydrogels. In this embodiment, typically no diluent would be required.

The polymers produced according to this invention can be used to produce contact lenses which will provide high oxygen permeability, good mechanical properties, and can be produced economically and efficiently. The polymer of this invention can be used to make biomedical devices that require biocompatibility and high oxygen permeability.

DETAILED DESCRIPTION OF THE INVENTION

The term "monomer" used herein refers to low molecular weight compounds (i.e. typically having number average molecular weights less than 700) that can be polymerized, and to medium to high molecular weight compounds or polymers, sometimes referred to as macromonomers, (i.e. typically having repeating structural units and a number average molecular weights greater than 700) containing functional groups capable of further polymerization. Thus, it is understood that the terms "silicone-containing monomers" and "hydrophilic monomers" include monomers, macromonomers and prepolymers. Prepolymers are partially polymerized monomers or monomers which are capable of further polymerization.

A "polymeriaable group" is a carbon-carbon double bond group which can polymerize when subjected to radical polymerization initiation conditions. Examples of polymerizable groups include acrylate, methacrylate, styryl, vinyl, allyl or N-vinyl lactam.

A "silicone-containing monomer" is one that contains at least two [—Si—O—] repeating units in a monomer, macromer or prepolymer. Preferably, the total Si and attached O are present in the silicone-containing monomer in an amount greater than 20 weight percent, and more preferably greater than 30 weight percent of the total molecular weight of the silicone-containing monomer.

In the preferred hydroxyalkylamine-functional silicone-containing monomer according to Structure I, $R^2$, $R^4$, $R^5$, $R^6$, and $R^7$ are independently selected from methyl, benzyl, phenyl and ethyl, more preferably methyl; $R^1$ and $R^8$ are both nitrogen-containing groups according to Structure II, and $R^3$ is selected from methyl, ethyl, phenyl and benzyl, more preferably methyl. The preferred hydroxyalkylamine-functional silicone-containing monomer of this invention generally has between 2 to 20 nitrogen groups per molecule on average, and 2 to 5 polymerizable groups per molecule on average.

The preferred hydroxyalkylamine-functional silicone-containing monomers have the following structure:

Structure IV

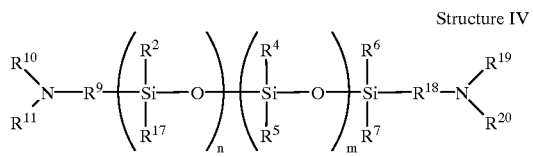

in which the substituents are as defined above with the same preferred groups except that $R^7$ is defined as an alkyl group or aryl group which may additionally comprise an alcohol, ester, amine, ketone, carboxylic acid or ether group, and $R^{18}$, $R^{19}$ and $R^{20}$ are defined as $R^9$, $R^{10}$ and $R^{11}$ respectively.

Useful hydroxyalkylanmine-functional silicone-containing monomers include the following structures:

Structure V

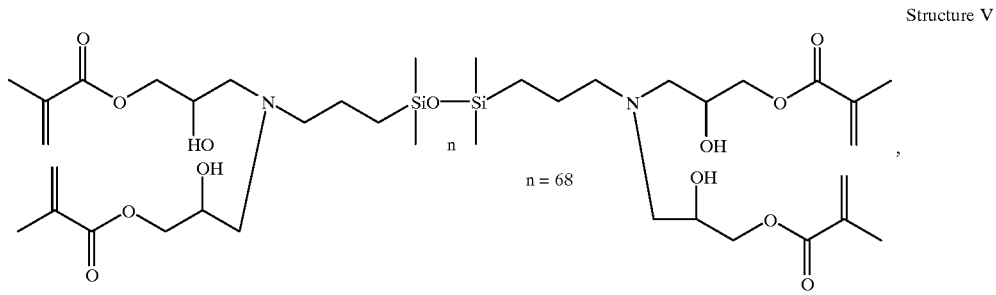

or the hydroxyalkylamine-functional silicone-containing monomer of Structure V modified to have an average ratio of OH/polymerizable group, (OH/acrylate) of greater than 1:

Structure VI

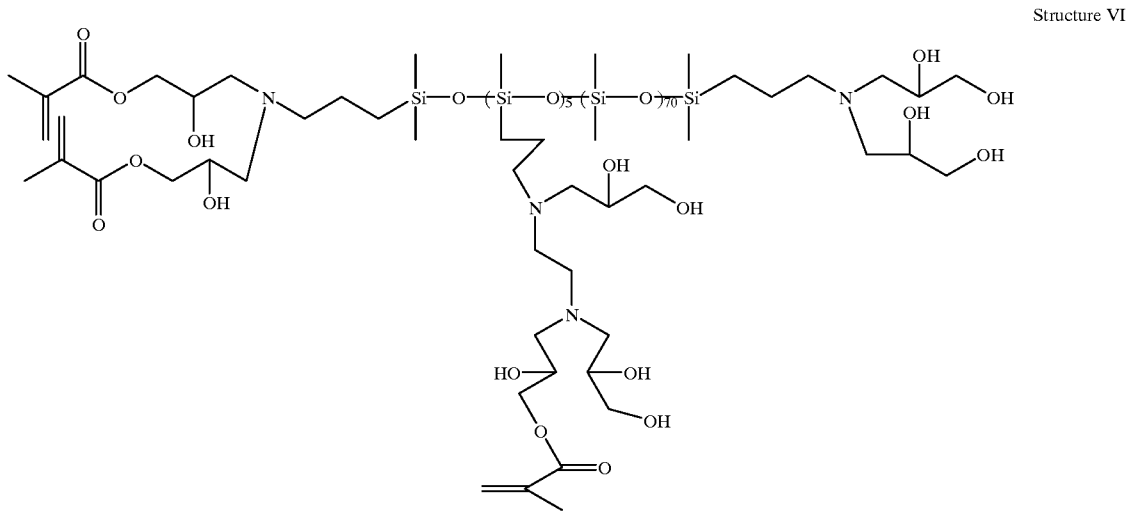

-continued
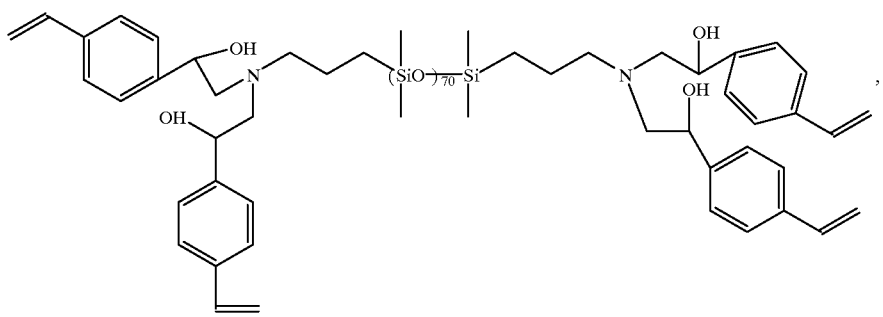
Structure VII
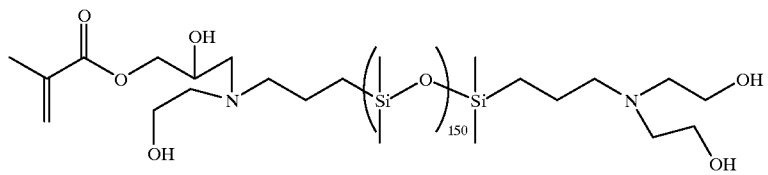
Structure VIII
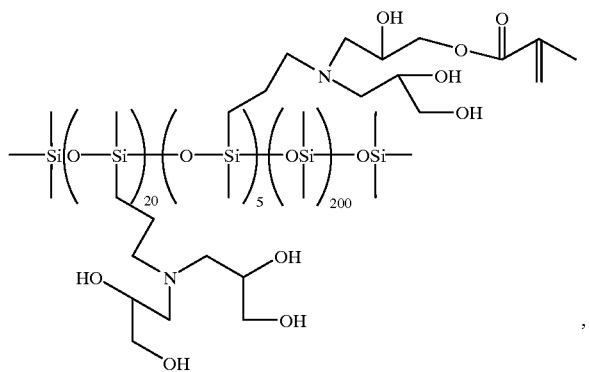
Structure IX
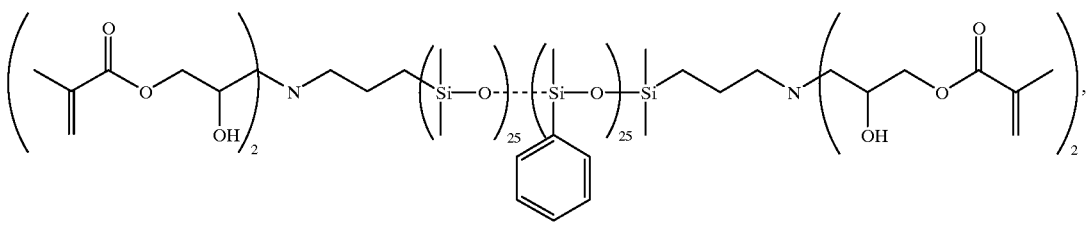
Structure X
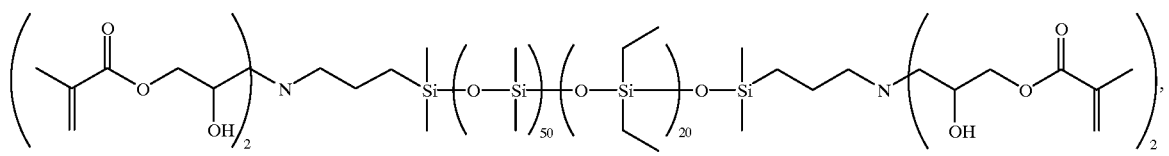
Structure XI
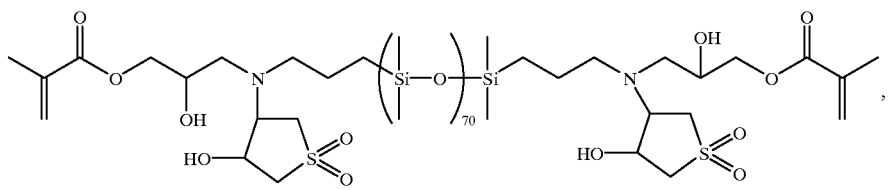
Structure XII

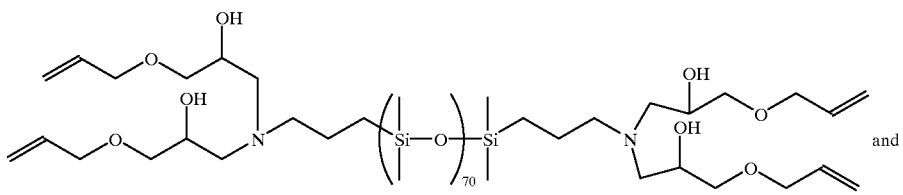

Structure XIII

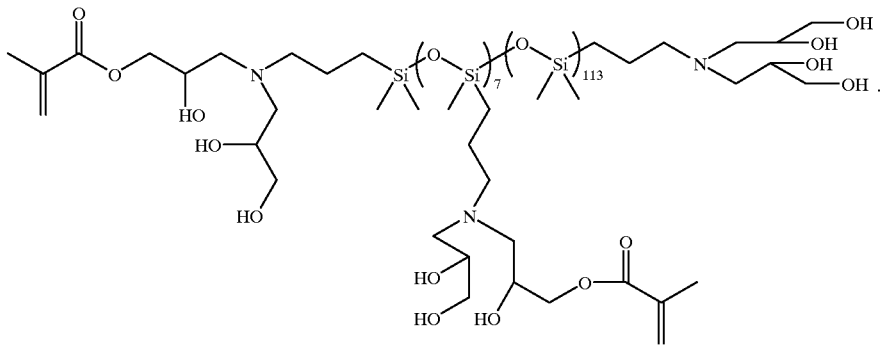

Structure XIV

For Structure XIV, the average number of acrylate groups per molecule is 3. The acrylate groups can be located terminally or pendantly.

The most preferred hydroxyalkylamine-functional silicone-containing monomer is according to Structure V.

The hydroxyalkylamine-functional silicone-containing monomers can be made by reacting an epoxy-functional compound having a polymerizable group with a polysiloxane having amino-functional groups. This reaction is typically conducted with heating at from about 50° C. to about 130° C. Initiators such as N-benzyl-N,N,N-triethyl-ammonium iodide can be used. The reaction typically takes from 3 to 20 hours. Epoxy-functional compounds that can be used include glycidyl methacrylate, glycidyl acrylate, epoxyethylstyrene, vinyl glycidyl ether and allyl glycidyl ether. Amino-functional polysiloxanes that can be used include those with aminoalkyl groups such is aminopropyl or N-ethyl-3-aminopropyl groups, and these groups may be located in terminal or pendent positions, or both. The silicone portion of the silicone-containing monomers may comprise polydimethylsiloxane (PDMS) as well as siloxanes with other monovalent groups bound to the silicon, such as substituted or unsubstituted ethyl, propyl, benzyl and phenyl. These silicone portions can be branched or linear. The epoxy-functional compound can be used in a molar amount that is less than or equal to the molar amount of N—H groups on the amine-functional silicone; however, it is preferred to use a molar excess of the epoxy-functional compound. The excess amount that does not react can either be allowed to polymerize into the final polymer, or can be removed from the hydroxyalkylamine-functional silicone-containing monomer prior to curing the reaction mixture. For example, glycidyl methacrylate can often be removed by multiple extractions with acetonitrile. The reaction of amino-functional silicones with ester-containing epoxides such as glycidyl methacrylate leads to hydroxyalkyl amino esters which under typical reaction conditions may transesterify, leading to a mixture of various OH/polymerizable group (OH/ester) substitution patterns. The average number of polymerizable groups per molecule may vary from 1 to 20, preferably 2 to 15 and more preferably 2 to 6, but in general if the number of polymerizable groups per molecular mass of the silicone-containing monomer is too low, a substantial fraction of the silicone-containing monomer will not polymerize. If, on the other hand, the number of polymerizable groups is too high the resulting final hydrogel polymer will be too stiff. A preferred range of concentrations of polymerizable groups would be about 0.0002 to about 0.0016 moles per gram. A more preferred range would be 0.0004 to about 0.001 moles per gram. Increasing the average number of OH groups per molecule of the hydroxyalkylamine-functional silicone-containing monomer will generally increase the water content of the silicone hydrogel and improve compatibility with hydrophilic monomers, such as DMA, but it may also decrease oxygen permeability of the final silicone hydrogel; therefore, the number of OH's will typically be equal to or greater than the number of polymerizable groups. The preferred average number per molecule is from 1 to 40, and more preferred is from 2 to 20.

The monomer mix in the reaction mixture used to make the silicone hydrogel may contain a blend of one or more hydroxyalkylamine-functional silicone-containing monomers.

In preferred embodiments, hydrophilic monomers are added to the hydroxyalkylamine-functional silicone-containing monomer in the reaction mixture used to form the silicone hydrogels of this invention. The hydrophilic monomers can be any of the known monomers used in the prior art to make silicone hydrogels. The preferred hydrophilic monomers may be either acrylic- or vinyl-containing. Such hydrophilic monomers may themselves be used as crosslinking agents. The term "vinyl-type" or "vinyl-containing" monomers refers to monomers containing the vinyl grouping (—CH=CH$_2$) and are generally highly reactive. Such hydrophilic vinyl-containing monomers are known to polymerize relatively easily. Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, and N-vinyl formamide. NVP is preferred. "Acrylic-type" or "acrylic-containing" monomers are those monomers containing the acrylic group:

CH$_2$=CRCOX wherein R is H or CH$_3$, and X is O or N, and are also known to polymerize readily. Examples of acrylic-type monomers useful in this invention include N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, incorporated herein by reference, and the hydrophilic oxazolone anonomers disclosed in U.S. Pat. No. 4,910,277, incorporated herein by reference. Other suitable hydrophilic monomers will be apparent to one skilled in the art.

The preferred hydrophilic monomers which may be incorporated into the polymer of the present invention include hydrophilic monomers such as N,N-dimethyl acrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid and acrylic acid. The more preferred hydrophilic monomers are selected from the group consisting of DMA, HEMA and NVP. DMA is the most preferred.

In other embodiments, additional silicone-containing monomers which are silicone monomers not according to Structure I can also be added to the monomer mix with or without the presence of hydrophilic monomer. The additional silicone-containing monomers which can be added to the reaction mixture preferably comprise polymerizable functional groups such as acrylate, methacrylate, acrylamide, methacrylamide, N-vinyl lactam, and styryl functional groups. Examples of additional silicone-containing monomers which may be added to the reaction mixture are disclosed in U.S. Pat. Nos. 4,136,250; 4,153,641; 4,740,533; 5,034,461; and 5,070,215, which are incorporated herein by reference.

Preferred examples of suitable additional silicone-containing monomers are polysiloxanylalkyl (meth)acrylic monomers represented by the following structure:

Structure XV

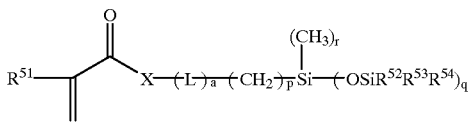

wherein R$^{51}$ is H or CH$_3$, q is 1 to 3 and for each q, R$^{52}$, R$^{53}$ and R$^{54}$ are independently methyl, benzyl, phenyl or a monovalent siloxane chain comprising from 1 to 100 repeating Si—O units, p is 1 to 10, r=(3−q), X is O or NR$^{55}$, where R$^{55}$ is H or a monovalent alkyl group with 1 to 4 carbons, a is 0 or 1, and L is a divalent linking group which preferably comprises from 2 to 5 carbons and may also comprise ether or hydroxyl groups, for example, a polyethylene glycol chain. Useful polysiloxanylalkyl (meth)acrylic monomers according to Structure XV are further described by Varderlaan et al, in "Contact Lenses", U.S. Ser. No. 09/033,347 (VTN-396) filed concurrently herewith and incorporated herein by reference.

Examples of useful polysiloxanylalkyl (meth)acrylic monomers which can be added to the reaction mixture include methacryloxypropyl tris(trimethylsiloxy)silane, pentamethyldisiloxanyl methylmethacrylate, phenyltetramethyl-disiloxanylethyl acrylate, 3methacryloxypropylbis(trimethylsiloxy)methylsilane, methacryloxypropylpentamethyldisiloxane and methyldi(trimethylsiloxy)methacryloxymethyl silane. Methacryloxypropyl tris(trimethylsiloxy)silane and 3methacryloxypropylbis(trimethylsiloxy)methylsilane are preferred.

Optionally, mixtures of other silicone-containing monomers and crosslinkers can be added to the reaction mixture, such as those described in U.S. Ser. No. 08/948,128 "Silicone Hydrogel Polymers" (VTN-0381) filed Oct. 9, 1997, which is incorporated herein by reference, with or without the presence of one or more hydrophilic monomers. Other monomers that can be present in the reaction mixture include ultra-violet absorbing monomers, reactive tints and the like. Additional processing aids such as release agents or wetting agents can also be added to the reaction mixture.

The preferred embodiment comprises silicone-containing monomer of Structure I, additional silicone-containing monomer, and hydrophilic monomer. The more preferred embodiments comprise the more preferred silicone-containing monomers of Structure I, the more preferred additional silicone-containing monomers, and the more preferred hydrophilic monomers which were described above.

A polymerization initiator is preferably included in the reaction mixture. The polymerization initiator can be a compound such as lauroyl peroxide, benzoyl peroxide, isopropyl percarbonate, azobisisobutyronitrile, or the like, that generates free radicals at moderately elevated temperatures, or the polymerization initiator can be a photoinitiator system such as an aromatic alpha-hydroxy ketone or a tertiary amine plus a diketone. Illustrative examples of photoinitiator systems are 2-hydroxy-2-methyl-1-phenyl-propan-1-one, and a combination of camphorquinone and ethyl 4-(N,N-dimethylamino)benzoate. The initiator is used in the reaction mixture in effective amounts, e.g., from about 0.1 to about 2 parts by weight per 100 parts of reactive components in the reaction fixture. Polymerization of the monomers in the reaction mixture can be initiated using the appropriate choice of heat or visible or ultraviolet light or other means depending on the polymerization initiator used. The preferred initiator is 2-hydroxy-2-methyl-1-phenyl-propan-1-one, and the preferred method of polymerization initiation is UV light.

Typically after curing the reaction mixture (which is defined as the hydroxyalkylanine-functional silicone-containing monomer and any optional materials, such as, hydrophilic monomers, additional silicone-containing monomers, diluents, crosslinking agents, initiators, release agents, tints and inert additives, etc. which are combined prior to curing), the resulting polymer is treated with a solvent to remove the diluent (if used) or any traces of unreacted components and then hydrated to form the hydrogel. The solvent used may be water (or an aqueous solution such as physiological saline), or depending on the solubility characteristics of the diluent (if used) and/or the solubility characteristics of any residual unpolymerized monomers, the solvent can be an organic liquid such as ethanol, methanol, isopropanol, mixtures thereof or the like, or a mixture of one or more of such organic liquids with water. The solvent can be removed by extraction with pure water or physiological saline which removes the solvent and hydrates the polymer to produce a silicone hydrogel. The silicone hydrogels and contact lenses of this invention preferably comprise 2 to 50 weight percent water, more preferably 15 to 45 weight percent water, and most preferably 20 to 40 weight percent water of the total weight of the silicone hydrogels. These silicone hydrogels are particularly suited for making contact lenses or interocular lenses, preferably soft contact lenses.

Various processes are known for molding the reaction mixture in the production of contact lenses, including spin-casting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer in the approximate shape of the final desired product. Then, this polymer mixture is optionally treated with a solvent and then water, producing a silicone hydrogel having a final size and shape which are quite similar to the size and shape of the original molded polymer article. This method can be used to form contact lenses and is further described in U.S. Pat. Nos. 4,495,313; 4,680,336; 4,889,664; and 5,039,459, incorporated herein by reference. After producing the silicone hydrogel, it is preferred that the lens be coated with a hydrophilic coating. Some methods of adding hydrophilic coatings to a lens have been disclosed in the prior art, including U.S. Pat. Nos. 3,854,982 and 3,916,033; WO 91/04283, and EPO 93810399.

The preferred range of the hydroxyalkylamine-functional silicone-containing monomer present in the reaction mixture is from about 5 to 100 weight percent, more preferably about 10 to 90 weight percent, and most preferably about 15 to 80 weight percent of the reactive components in the reaction mixture. Reactive components are materials which react and become part of the final silicone hydrogel. If additional silicone-containing monomers are present in the reaction mixture, then the combined preferred range of the hydroxyalkylamine-functional silicone-containing monomer and additional silicone-containing monomer in the reaction mixture is from about 5 to 100 weight percent, more preferably about 10 to 90 weight percent, and most preferably about 15 to 80 weight percent of the reactive components in the reaction mixture. The preferred range of hydrophilic monomer if present in the reaction mixture is from about 5 to 80 weight percent, more preferably about 10 to 60 weight percent, and most preferably about 20 to 50 weight percent of the reactive components in the reaction mixture. The preferred range of diluent in the reactive mixture is from about 0 to 70 weight percent, more preferably about 0 to 50 weight percent, and most preferably about 0 to 20 weight percent of the total reaction mixture. The amount of diluent required varies depending on the nature and relative amounts of the reactive components and on the amount of hydrophilic groups present in the hydroxyalkylamine-functional silicone-containing monomer, but the amounts of the claimed diluents are generally substantially less than the amounts required for the polysiloxane monomers disclosed in the prior art. For example, mixtures containing $\alpha,\omega$-bismethacryloxypropyl polydinethylsiloxane with molecular weights greater than 2000 or 3000 and especially for molecular weights greater than 5000 and relatively large amounts of the hydrophilic monomer, that is, greater than 20%, or 25% or especially greater than 30% of the reaction mixture, generally require relatively high levels of diluent, but require much less diluent if one of the novel hydroxyalkylamine-functional silicone-containing monomers described herein is used in place of the $\alpha,\omega$-bismethacryloxypropyl polydimethylsiloxane.

In the preferred reaction mixtures 10 to 60, more preferably 15 to 50 weight percent of the reactive components is hydroxyalkylamine-functional silicone-containing monomer, 20 to 50 weight percent of the reactive components is an additional silicone-containing monomer, preferably a polysiloxanylalkyl (meth)acrylate, (more preferably having the Structure XV), 10 to 50 weight percent of the reactive components is a hydrophilic monomer, (more preferably DMA), and 0.1 to 1.0 percent by weight of the reactive components is a UV or visible light-active photoinitator, and 0 to 20 weight percent of the total reaction mixture is diluent, preferably a secondary or tertiary alcohol, more preferably a tertiary alcohol.

The reaction mixtures of the present invention can be formed by any of the methods known to those skilled in the art, such as shaking or stirring, and used to form polymeric articles or devices by the methods described earlier. For some monomer reaction mixtures, it is preferred to cure the reactive mixtures at temperatures slightly above room temperature, such as 30–40° C., or below room temperature such as 0–10° C., so as to prevent phase separation of the components.

The Examples below further describe this invention. Some of the materials that are employed in the Examples are identified as follows:

"DAROCURE 1173" 2-hydroxy-2-methyl-1-phenyl-propan-1-one,

"DMA" N,N-dimethylacrylamide

"MBM" 3-methacryloxypropylbis(trimethylsiloxy)methylsilane.

PREPARATION 1—Preparation of Polysiloxane Monomer 500 grams of $\alpha,\omega$-bisaminopropyl polydimethylsiloxane (5000 MW) and 68 grams of glycidyl methacrylate were combined and heated with stirring at 100° C. for 10 hours. The product was extracted five times with 1500 ml of acetonitrile to remove residual glycidyl methacrylate, and residual acetonitrile was removed under reduced pressure to give a clear oil. IR: 3441, 2962, 1944, 1725, 1638, 1612, 1412 $cm^{-1}$. This product will be referred to as "the reaction product of glycidyl methacrylate and 5000 MW $\alpha,\omega$-bisaminopropyl polydimethylsiloxane" or alternatively bis (N,N-bis-2-hydroxy-3-methacryloxypropyl)aminopropyl polydimethylsiloxane.

EXAMPLE 1

38.2 parts by weight of the product of PREPARATION 1 was combined with 28.8 parts MBM, 33 parts DMA by weight of the reactive components, and 1 part DAROCUR 1173 and diluted with 3-methyl-3-pentanol to make a reaction mixture containing 9 weight percent diluent. The resulting reaction mixture was a clear, homogeneous solution. Polypropylene contact lens molds were filled, closed and irradiated with a total of 3.2 J/cm$^2$ UV light from a fluorescent UV source over a 30-minute period. The molds were opened and the lenses were released into isopropanol and then transferred into deionized water.

The lenses were clear and had a tensile modulus of 205±12 g/mm$^2$, an elongation at break of 133±37%, and an equilibrium water content of 24.2±0.2%. Tensile properties were determined using an Instrom™ model 1122 tensile tester. Equilibrium Water Contents (EWC) were determined gravimetrically and are expressed as:

%EWC=100×(mass of hydrated lens−mass of dry lens)/mass of hydrated lens

EXAMPLES 2–16

Reaction mixtures were made using the formulation of Example 1, but with the formulations and diluent levels listed in Table 1. All the reaction mixtures and lenses were clear.

COMPARATIVE EXAMPLES 1–4

Reaction mixtures were made using the formulations of Examples 5, 6, 8 and 17, but with α,ω-bismethacryloxypropyl polydimethylsiloxane (5000 MW) in place of the product of Example 1 and with the minimal amount of 3-methyl-3-pentanol diluent needed to make a reaction mixture which would produce clear lenses after hydration. The composition of the reaction mixtures for Comparative Examples 1–4 are in Table 2.

TABLE 1

Hydrogel Monomer Formulations and Properties

| Example | 1 | 2 | 3 | 4 |
|---|---|---|---|---|
| Composition | | | | |
| Prep Macromer | 38.2 | 33.5 | 27.6 | 22.3 |
| MBM | 28.8 | 33.5 | 39.4 | 44.7 |
| DMA | 33 | 33 | 33 | 33 |
| Darocur | 0.4 | 0.4 | 0.4 | 0.4 |
| % of Diluent | 9 | 7 | 5 | 4 |
| EWC (%) | 24.2 ± 0.2 | 23.3 ± 0.3 | 22.4 ± 0.2 | 24.2 ± 0.3 |
| Modulus (psi) | 205 ± 12 | 178 ± 11 | 136 ± 4 | 109 ± 3 |
| % Elongation | 133 ± 27 | 156 ± 39 | 168 ± 48 | 200 ± 58 |
| Dk (barrers) | 142.3 | 144.9 | 145.1 | 109.3 |
| Example | 5 | 6 | 7 | 8 |
| Composition | | | | |
| Prep Macromer | 37.1 | 32.5 | 26.8 | 21.7 |
| MBM | 27.9 | 32.5 | 38.2 | 43.3 |
| DMA | 35 | 35 | 35 | 35 |
| Darocur | 0.4 | 0.4 | 0.4 | 0.4 |
| % of Diluent | 10 | 7 | 5 | 11 |
| EWC (%) | 26.1 ± 0.3 | 25.8 ± 0.3 | 25.8 ± 0.3 | 25.8 ± 0.1 |
| Modulus (psi) | 179 ± 5 | 215 ± 7 | 132 ± 6 | 101 ± 4 |
| % Elongation | 151 ± 42 | 106 ± 30 | 195 ± 65 | 179 ± 47 |
| Dk (barrers) | 118.8 | 129.6 | 116.5 | 107.9 |
| Example | 9 | 10 | 11 | 12 |
| Composition | | | | |
| Prep Macromer | 35.4 | 31 | 25.5 | 20.7 |
| MBM | 26.6 | 31 | 36.5 | 41.3 |
| DMA | 38 | 38 | 38 | 38 |
| Darocur | 0.4 | 0.4 | 0.4 | 0.4 |

TABLE 1-continued

Hydrogel Monomer Formulations and Properties

| % of Diluent | 12 | 7 | 7 | 5 |
|---|---|---|---|---|
| EWC (%) | 29.4 ± 0.3 | 30.0 ± 0.3 | 26.6 ± 0.2 | 26.7 ± 0.3 |
| Modulus (psi) | 215 ± 7 | 175 ± 7 | 132 ± 51 | 106 ± 4 |
| % Elongation | 99 ± 22 | 132 ± 40 | 166 ± 51 | 204 ± 55 |
| Dk (barrers) | 106.6 | 115.7 | 104.9 | 100.3 |
| Example | 13 | 14 | 15 | 16 |
| Composition | | | | |
| Prep Macromer | 34.2 | 30 | 24.7 | 20 |
| MBM | 25.8 | 30 | 35.3 | 40 |
| DMA | 40 | 40 | 40 | 40 |
| Darocur | 0.4 | 0.4 | 0.4 | 0.4 |
| % of Diluent | 12 | 11 | 8 | 9 |
| EWC (%) | 32.1 ± 0.1 | 31.2 ± 0.2 | 31.6 ± 0.3 | 31.7 ± 0.2 |
| Modulus (psi) | 218 ± 11 | 170 ± 6 | 131 ± 4 | 95 ± 3 |
| % Elongation | 110 ± 34 | 130 ± 51 | 185 ± 53 | 203 ± 47 |
| Dk (barrers) | 112.4 | 104.6 | 90.8 | 92.3 |

TABLE 2

Comparative Reaction mixtures

| | Comp. Ex. 1 | Comp. Ex. 2 | Comp. Ex. 3 | Comp. Ex. 4 |
|---|---|---|---|---|
| PDMS* | 20.0 | 37.1 | 22.3 | 26.8 |
| MBM | 40.0 | 27.9 | 44.7 | 38.2 |
| DMA | 40.0 | 35.0 | 33.0 | 35.0 |
| Davocur | 0.4 | 0.4 | 0.4 | 0.4 |
| % Diluent | 22.5 | 20.6 | 10.9 | 15.7 |

*PDMS = α,ω-bismethacryloxypropyl polydimethylsiloxane (5000 MW)

PREPARATION 2—Preparation of a Second Polysiloxane Monomer 2.48 grams 1,3-bis(3-aminopropyl)-tetramethyldisiloxane, 83.62 grams octamethylcyclotetrasiloxane, 13.37 grams 3-aminopropylmethyldiethoxysilane, 0.1 grams potassium hydroxide and 10.0 grams water were combined and heated with stirring, with removal of a water and ethanol azeotrope, to 145° C. The mixture was then cooled to 60° C., and 0.13 grams of acetic acid was added. The mixture was stirred for one hour and filtered through celite. The product was devolatilized by heating to 145° C. at about 1 torr.

10 grams of the aminofunctional polysiloxane fluid produced above were combined with 1.33 grams glycidol and 0.729 grams glycidyl methacrylate. A moderate exotherm was noted. The mixture was allowed to react for three days, during which time it became very viscous. The product was a pendant hydroxyalkylamine-functional silicone-containing monomer.

EXAMPLE 17

2.42 grams of PREPARATION 2 were combined with 0.29 grams 3-methyl-3pentanol and 0.027 grams Darocur 1173. Lenses were made by placing this blend into contact lens molds and exposing the molds to UV light. The hydrated lenses were soft and clear.

EXAMPLE 18

1.19 grams of PREPARATION 2 were combined with 0.50 grams TRIS, 0.30 grams DMA and 0.027 grams Darocur 1173. Lenses were made by placing this blend into polystyrene contact lens molds and exposing the molds to UV light. The hydrated lenses were soft and clear.

EXAMPLE 19

1.21 grams of PREPARATION 2 were combined with 0.726 grains DMA, 0.484 grams TRIS and 0.027 grams Darocur 1173. Lenses were made by placing this blend into contact lens molds and exposing the molds to UV light. The hydrated lenses were soft and clear.

EXAMPLE 20

0.689 grams of PREPARATION 2 were combined with 0.25 grams DMA, 0.31 grams TRIS and 0.027 grams Darocur 1173. Lenses were made by placing this blend into polystyrene contact lens molds and exposing the molds to UV light. The hydrated lenses were soft and clear.

Table 1 indicates that for Examples 1 through 16, less diluent was required to provide clear reaction mixtures and contact lenses as compared to tide Comparative Examples shown in Table 2 which required the addition of 2–3 times as much 3-methyl-3pentanol to make clear reaction mixtures. These examples demonstrate the improvement in compatibility of the hydroxyalkylamine-functional silicone-containing monomers of this invention in reaction mixtures to make contact lenses.

Examples 17 through 20 show that pendant hydroxyalkylamine-functional silicone-containing monomers of this invention can be used to make clear contact lenses in reaction mixtures with or without hydrophilic monomers and additional silicone-containing monomers.

This invention has been described with reference to particular embodiments; however, variations within the scope of the following claims are apparent to those of ordinary skill in the art.

We claim:

1. A silicone hydrogel polymer prepared by curing a reaction mixture comprising a hydroxyalkylamine-functional silicone-containing monomer, comprising the following structure:

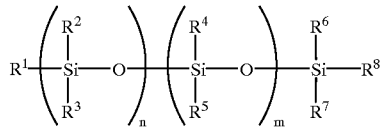

Structure I wherein:
n is 0 to 500 and m is 0 to 500 and (n+m)=10 to 500;
$R^2$, $R^4$, $R^5$, $R^6$ and $R^7$ are independently a monovalent alkyl, or aryl group, which may be further substituted with alcohol, ester, amine, ketone, carboxylic acid or ether groups, and
$R^1$, $R^3$ and $R^8$ are independently a monovalent alkyl, or aryl group, which may be further substituted with an alcohol, ester, amine, ketone, carboxylic acid or ether group; or have the following structure:

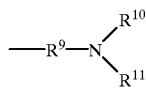

Structure II with the proviso that at least one of $R^1$, $R^3$, and $R^8$ are according to Structure II, wherein
$R^9$ is a divalent alkyl group;
$R^{10}$ and $R^{11}$ are independently H, a monovalent alkyl or aryl group which may be further substituted with an alcohol, ester, amine, ketone, carboxylic acid or ether group, or have the following structure:

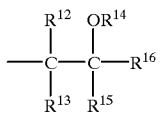

Structure III where $R^{14}$ is H, or a monovalent polymerizable group comprising acryloyl, methacryloyl, styryl, vinyl, allyl or N-vinyl lactam; $R^{16}$ is H, a monovalent alkyl or aryl group which can be further substituted with alcohol, ester, amine, ketone, carboxylic acid or ether groups, or a polymerizable group comprising acrylate, methacrylite, styryl, vinyl, allyl or N-vinyl lactam; $R^{12}$, $R^{13}$ and $R^{15}$ are independently H, a monovalent alkyl or aryl, which can be further substituted with alcohol, ester, amine, ketone, carboxylic acid or ether groups, or $R^{12}$ and $R^{15}$, or $R^{15}$ and $R^{13}$ can be bonded together to form a ring structure, with the proviso that at least one of the Structure II groups on the monomer comprise polymerizable groups.

2. The silicone hydrogel polymer of claim 1 wherein (n+m) is 20 to 250; $R^2$, $R^4$, $R^5$, $R^6$ and $R^7$ are independently unsubstituted monovalent alkyl or aryl groups; $R^9$ is —$(CH_2)_s$— where s is 1 to 10; $R^{14}$ is H or methacryloyl; $R^{16}$ is either alkyl substituted with an alcohol or methacrylate; and $R^{12}$, $R^{13}$ and $R^{15}$ are H.

3. The silicone hydrogel polymer of claim 1 wherein $R^2$, $R^4$, $R^5$, $R^6$, and $R^7$ are independently selected from methyl, benzyl, phenyl and ethyl; $R^1$ and $R^8$ are both groups according to Structure II, and $R^3$ is selected from methyl, ethyl, phenyl and benzyl.

4. The silicone hydrogel of claim 1 wherein said hydroxyalkylamine-functional silicone-containing monomer of this invention generally has between 2 to 20 nitrogen groups per molecule on average, and 2 to 5 polymerizable groups per molecule on average.

5. The silicone hydrogel of claim 1 wherein said hydroxyalkylamine-functional silicone-containing monomer has the following structure:

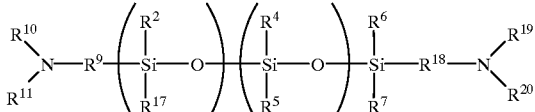

Structure IV wherein $R^2$, $R^4$, $R^5$, $R^6$, and $R^7$ are independently selected from methyl, benzyl, phenyl and ethyl; $R^{17}$ is defined as an alkyl group or aryl group which may be substituted with an alcohol, ester, amine, ketone, carboxylic acid or ether group, $R^9$ and $R^{18}$ are independently —$(CH_2)_s$— where s is from 1 to 10; and $R^{19}$, $R^{20}$, $R^{10}$ and $R^{11}$ are independently H, a monovalent alkyl or aryl group which may be further substituted with an alcohol, ester, amine, ketone, carboxylic acid or ether group, or has the following structure:

Structure III

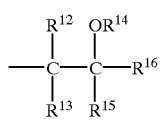

where $R^{14}$ is H, or a monovalent polymerizable group comprising acryloyl, methacryloyl, styryl, vinyl, allyl or N-vinyl lactam; $R^{16}$ is either H, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam; $R^{12}$, $R^{13}$ and $R^{15}$ are independently H, a monovalent alkyl or aryl, which can be further substituted with alcohol, ester, amine, ketone, carboxylic acid or ether groups, with the proviso that at least one of the Structure II groups on the monomer comprise polymerizable groups.

6. The silicone hydrogel of claim 1 wherein said hydroxyalkylamine-functional silicone-containing monomer is selected from the group consisting of:

Structure V

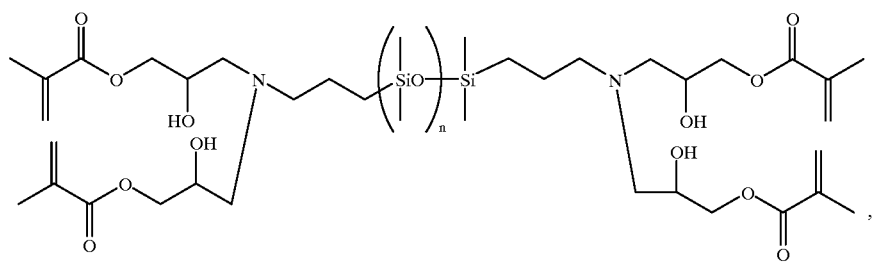

n = 68

Structure VI

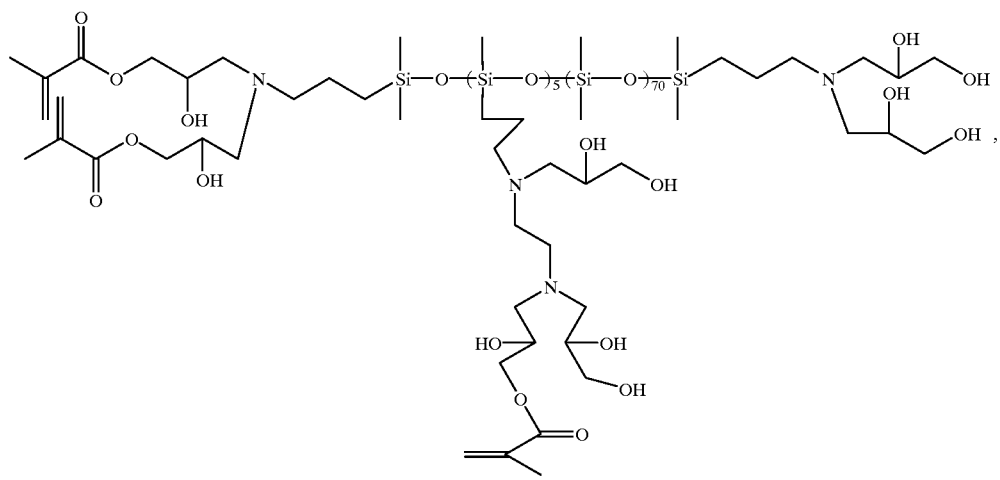

Structure VII

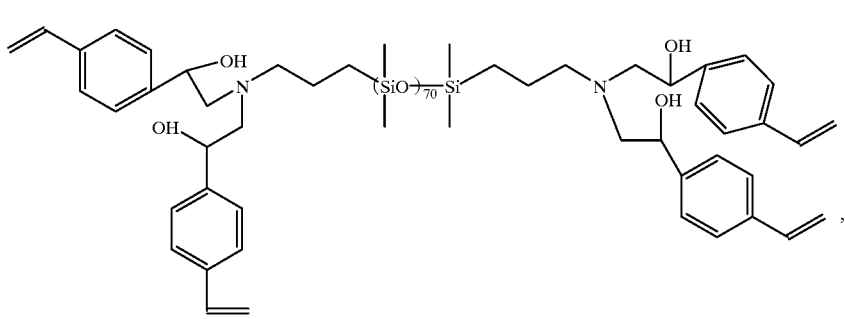

Structure VIII

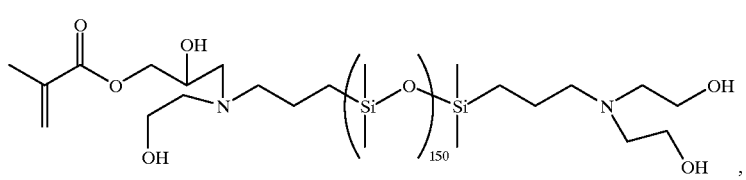

-continued
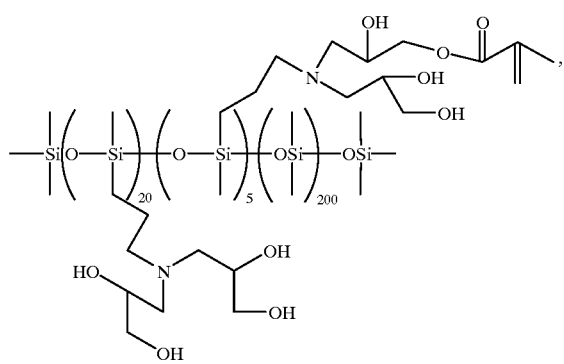
Structure IX
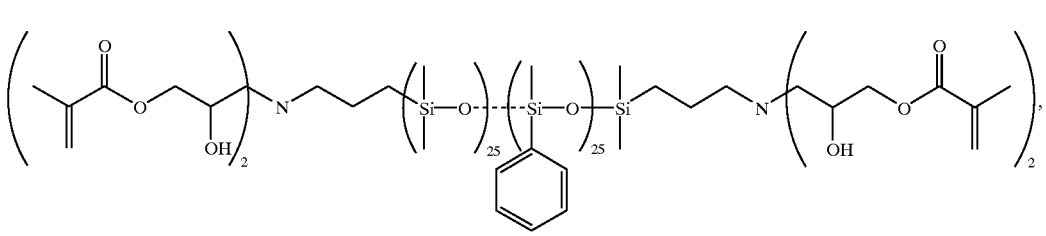
Structure X
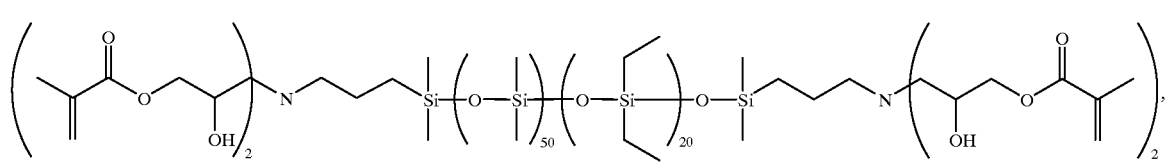
Structure XI
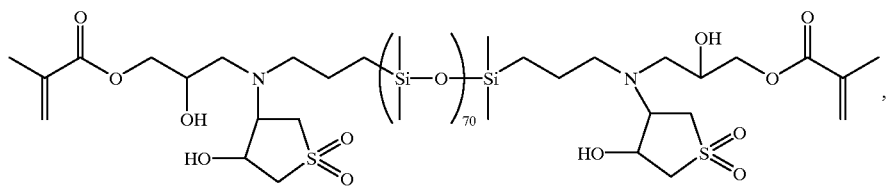
Structure XII
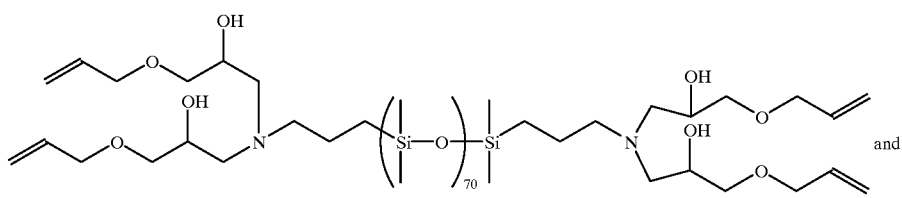
Structure XIII
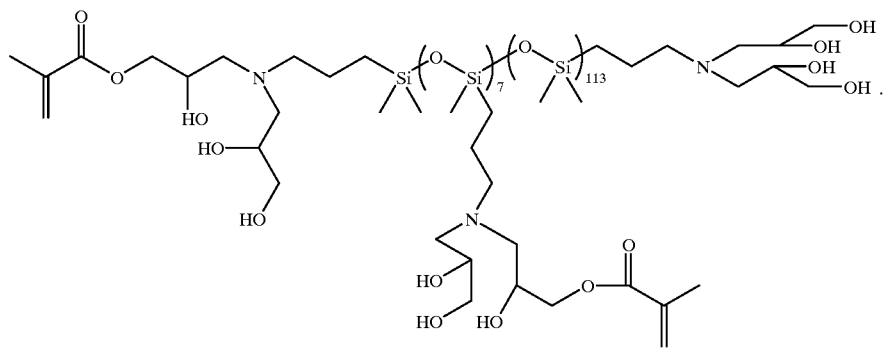
Structure XIV 7. The silicone hydrogel of claim 1 wherein said hydroxyalkylamine-functional silicone-containing monomer is:

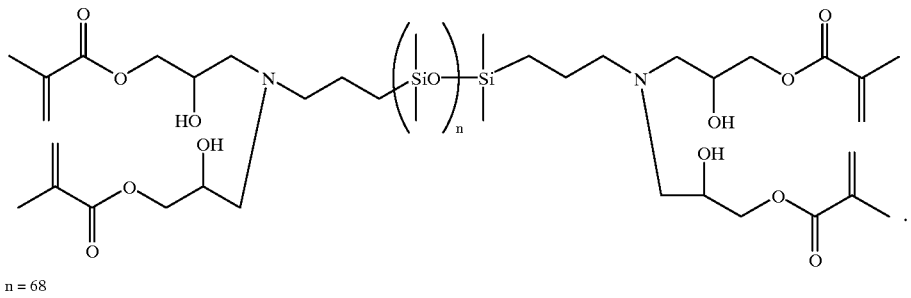

Structure V n = 68

8. The silicone hydrogel of claim 1 wherein said reaction mixture further comprises a hydrophilic monomer.

9. The silicone hydrogel of claim 8 wherein said hydrophilic monomer is selected from the group consisting of N,N-dimethyl acrylamide, 2-hydroxyethyl methacrylate, glycerol methacrylate, 2-hydroxyethyl methacrylamide, N-vinylpyrrolidone, polyethyleneglycol monomethacrylate, methacrylic acid ard acrylic acid.

10. The silicone hydrogel of claim 1 wherein said reaction mixture further comprises an additional silicone-containing monomer.

11. The silicone hydrogel of claim 8 wherein said reaction mixture further comprises an additional silicone-containing monomer.

12. The silicone hydrogel of claim 11 wherein said additional silicone-containing monomer is a polysiloxanylalkyl (meth)acrylic monomer.

13. The silicone hydrogel of claim 11 wherein said additional silicone-containing monomer has the structure:

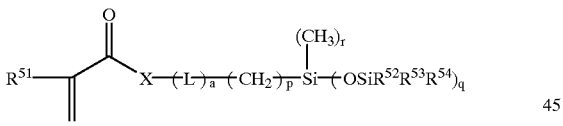

Structure XV wherein $R^{51}$ is H or $CH_3$, q is 1 to 3 and for each q, $R^{52}$, $R^{53}$ and $R^{54}$ are independently methyl, benzyl, phenyl or a monovalent siloxane chain comprising from 1 to 100 repeating Si—O units, p is 1 to 10, r=(3−q), X is O or $NR^{55}$, where $R^{55}$ is H or a monovalent alkyl group with 1 to 4 carbons, a is 0 or 1, and L is a divalent linking group.

14. The silicone hydrogel of claim 11 wherein said additional silicone-containing monomer is selected from the group consisting of methacryloxypropyl tris(trimethylsiloxy)silane, pentamethyldisiloxanyl methylmethacrylate, phenyltetramethyl-disiloxanylethyl acrylate, 3-methacryloxypropylbis(trimethylsiloxy) methylsilane, methacryloxypropylpentamethyldisiloxane and methyldi(trimethylsiloxy)methaceyloxymethyl silane N,N-dimethyl acrylamide.

15. The silicone hydrogel of claim 11 wherein said reaction mixture comprises hydroxyalkylamine-functional silicone-containing monomer as 10 to 60 weight percent of the reactive components, additional silicone-containing monomer as 20 to 50 weight percent of the reactive components, and hydrophilic monomer as 10 to 50 weight percent of the reactive components.

16. A soft contact lens comprising a silicone hydrogel polymer prepared by curing a reaction mixture comprising a linear or branched, block or random, hydroxyalkylamine-functional silicone-containing monomer, comprising the following structure:

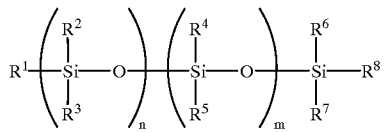

Structure I wherein:
n is 0 to 500 and m is 0 to 500 and (n+m)=10 to 500;
$R^2$, $R^4$, $R^5$, $R^6$ and $R^7$ are independently a monovalent alkyl, or aryl group, which may be further substituted with alcohol, ester, amine, ketone, carboxylic acid or ether groups, and
$R^1$, $R^3$ and $R^8$ are independently a monovalent alkyl, or aryl group, which may be further substituted with an alcohol, ester, amine, ketone, carboxylic acid or ether group, or have the following structure:

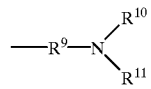

Structure II with the proviso that at least one of $R^1$, $R^3$, and $R^8$ are according to Structure II, wherein
$R^9$ is a divalent alkyl group such as —$(CH_2)_s$— where s is from 1 to 10;
$R^{10}$ and $R^{11}$ are independently H, a monovalent alkyl or aryl group which may be further substituted with an alcohol, ester, amine, ketone, carboxylic acid or ether group, or has the following structure:

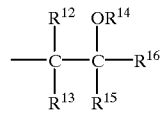

Structure III where $R^{14}$, is H, or a monovalent polymerizable group comprising acryloyl, methacryloyl, styryl, vinyl, allyl or N-vinyl lactam; $R^{16}$ is either H, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam; $R^{12}$, $R^{13}$ and $R^{15}$ are independently H, a monovalent alkyl or aryl, which can be further substituted with alcohol, ester, amine, ketone, carboxylic acid or ether groups, or $R^{12}$ and $R^{15}$, or $R^{15}$ and $R^{13}$ can be bonded together to form a ring structure, with the proviso that at least some of the Structure II groups on the monomer comprise polymerizable groups.

17. The soft contact lens of claim 16 further comprising an additional silicone-containing monomer and a hydrophilic monomer.

18. The soft contact lens of claim 16 wherein said hydroxyalkylamine-functional silicone-containing monomer is:

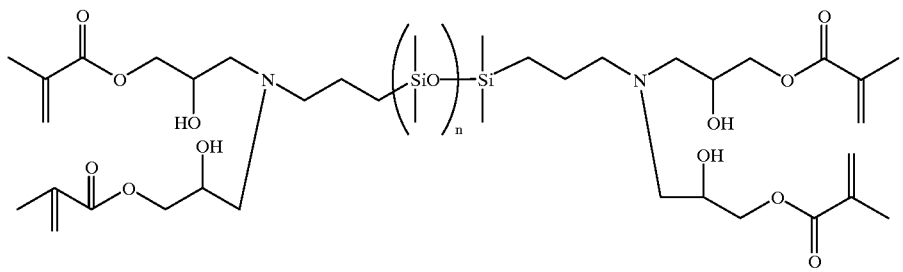

n = 68 said additional silicone-containing monomer is 3-methacryloxypropylbis (trimethylsiloxy) methylsilane, and said hydrophilic monomer is N,N-dimethyl acrylamide.

19. The soft contact lens of claim 16 wherein said hydroxyalkylamine-functional silicone-containing monomer is:

Structure XIV

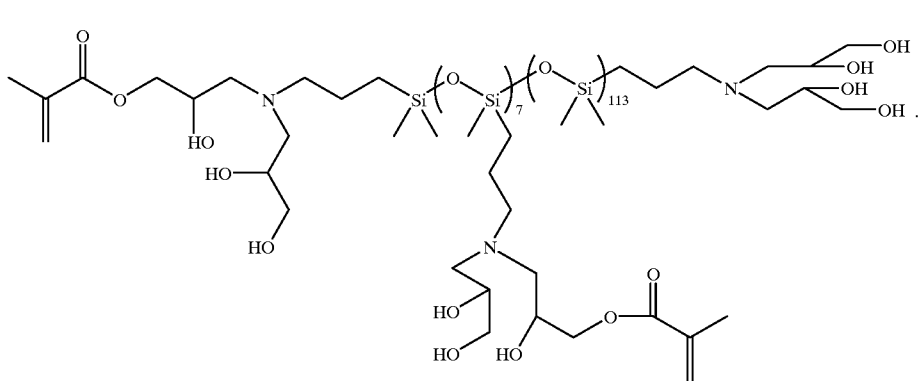

* * * * *

UNITED STATES PATENT AND TRADEMARK OFFICE
CERTIFICATE OF CORRECTION

PATENT NO. : 5,962,548
DATED : October 5, 1999
INVENTOR(S) : Vanderlaan et al.

Page 1 of 1

It is certified that error appears in the above-identified patent and that said Letters Patent is hereby corrected as shown below:

In Claim 18, Line 18 of the Patent, change "16" to --17--.

Signed and Sealed this

Twelfth Day of June, 2001

*Attest:*

*Attesting Officer*

NICHOLAS P. GODICI
*Acting Director of the United States Patent and Trademark Office*